United States Patent
Cook

(10) Patent No.: US 8,623,309 B2
(45) Date of Patent: Jan. 7, 2014

(54) METHODS OF PREPARING CLUSTERBORON

(75) Inventor: Kevin S. Cook, Carl Junction, MO (US)

(73) Assignee: SemEquip, Inc., North Billerica, MA (US)

(*) Notice: Subject to any disclaimer, the term of this patent is extended or adjusted under 35 U.S.C. 154(b) by 254 days.

(21) Appl. No.: 12/741,198

(22) PCT Filed: Nov. 3, 2008

(86) PCT No.: PCT/US2008/012469
§ 371 (c)(1),
(2), (4) Date: Apr. 28, 2011

(87) PCT Pub. No.: WO2009/058405
PCT Pub. Date: May 7, 2009

(65) Prior Publication Data
US 2011/0195009 A1    Aug. 11, 2011

Related U.S. Application Data

(60) Provisional application No. 61/001,682, filed on Nov. 2, 2007.

(51) Int. Cl.
*C01B 6/10* (2006.01)
(52) U.S. Cl.
USPC .......................................... 423/294; 423/295

(58) Field of Classification Search
USPC .................................................. 423/294, 295
See application file for complete search history.

(56) References Cited

U.S. PATENT DOCUMENTS

2005/0163693 A1* 7/2005 Spielvogel et al. ........... 423/294
2005/0169828 A1* 8/2005 Spielvogel et al. ........... 423/294

OTHER PUBLICATIONS

Pitochelli, A.R., et al. "The Preparation of New Boron Hydride $B_{18}H_{22}$", Journal. Amer. Chem. Soc., vol. 84, p. 3218, XP002633605 (1962).
Olsen, F.P., et al. "The Chemistry of $n$-$B_{18}H_{22}$ and $i$-$B_{18}H_{22}$", Jour. Amer. Chem. Society, vol. 90, No. 15, pp. 3946-3951, XP008110233 (Jul. 17, 1968).
Supplementary European Search Report dated May 9, 2011 for related European application EP08845116.6.

* cited by examiner

*Primary Examiner* — Wayne Langel
*Assistant Examiner* — Syed Iqbal
(74) *Attorney, Agent, or Firm* — Edwards Wildman Palmer LLP; Peter F. Corless

(57) ABSTRACT

The invention provides new methods for synthesis of ClusterBoron ($B_{18}H_{22}$). Preferred methods of the invention include in situ generation of the conjugate acid of $B_{20}H_{18}2-$ and degradation of the acid in solution to produce $B_{18}H_{22}$ in high yields and high purity. The invention further provides isotopically enriched boranes, particularly isotopically enriched $^{10}B)_{18}H_{22}$ and $^{11}B_{18}H_{22}$.

22 Claims, 2 Drawing Sheets

METHODS OF PREPARING CLUSTERBORON

RELATED APPLICATIONS

The present application is a 35 U.S.C. 5371 U.S. national entry of International Application PCT/US2008/012469 (WO 2009/058405) having an International filing date of Nov. 3, 2008 which claims the benefit of U.S. provisional application No. 61/001,682 filed Nov. 2, 2007, both of which applications being incorporated herein by reference in their entireties.

BACKGROUND

1. Field of the Invention

The invention provides methods for synthesizing $B_{18}H_{22}$ as a mixture of syn and anti isomers, commonly marketed as ClusterBoron. The invention further provides isotopically enriched $B_{18}H_{22}$ prepared by the aforementioned methods. In particular, the invention relates the preparation of natural abundance $B_{18}H_{22}$, $^{10}B$-enriched $B_{18}H_{22}$ and $^{11}B$-enriched $B_{18}H_{22}$.

2. Background.

Large boron hydride compounds have become important feed stocks for boron doped P-type impurity regions in semiconductor manufacture. More particularly, high molecular weight boron hydride compounds, e.g., boron hydride compounds comprising at least a five (5) boron atom cluster, are preferred boron atom feed stocks for molecular boron implantation.

An important aspect of modern semiconductor technology is the continuous development of smaller and faster devices. This process is called scaling. Scaling is driven by continuous advances in lithographic process methods, allowing the definition of smaller and smaller features in the semiconductor substrate which contains the integrated circuits. A generally accepted scaling theory has been developed to guide chip manufacturers in the appropriate resize of all aspects of the semiconductor device design at the same time, i.e., at each technology or scaling node. The greatest impact of scaling on ion implantation processes is the scaling of junction depths, which requires increasingly shallow junctions as the device dimensions are decreased. This requirement for increasingly shallow junctions as integrated circuit technology scales translates into the following requirement: ion implantation energies must be reduced with each scaling step. The extremely shallow junctions called for by modern, sub-0.13 micron devices are termed "Ultra-Shallow Junctions" or USJs.

Methods of manufacturing boron doped P-type junctions have been hampered by difficulty in controlling the ion-implantation process using boron. The single boron atom, being light (MW=10.8), can penetrate too deeply into a silicon substrate and diffuse throughout the substrate lattice rapidly during annealing or other elevated temperature processes.

Boron clusters or cages, e.g., boranes have been investigated as a feed stock for delivering molecular boron species to a semiconductor substrate with reduced penetration. See PCT/US03/20197.

Large boron hydride compounds, that is boron compounds having between 5 and about 100 boron atoms are preferred for use in molecular ion implantation methods for delivering boron atoms to a semiconductor substrate. Typically, there may be isomers of the boron hydride compound that exist. That is, boron hydrides with the same number of boron and hydrogen atoms that possess different chemical properties, e.g. structural isomers or stereoisomers. In addition, two or more structurally related boron hydride compounds having the same number of boron atoms but different numbers of hydrogen atoms have been isolated for various sized boron clusters. For example, pentaborane(9) and pentaborane(11) have chemical formulas of $B_5H_9$ and $B_5H_{11}$ respectively. Such compounds are frequently classified as closo ($B_nH_n$), nido($B_nH_{n+2}$), arachno ($B_nH_{n+4}$), hypho ($B_nH_{n+6}$), conjuncto ($B_nH_{n+8}$), and the like. Thus, different boron hydride species, including isomers and compounds containing various amounts of hydrogen, are frequently known for boron hydrides having n boron atoms. Jemmis, et al. have provided a review of various macropolyhedral boranes and known compounds having n boron atoms and various amounts of hydrogen.[1,2]

Mixtures of isomers and mixtures of n-boron atom containing boron hydrides are suitable for use in the implantation methods discussed. The molecular ions generated by the ionization process of boron hydride mixtures will have uniform and narrow weight distributions.

Current synthetic technologies for the preparation of large boron hydride molecules, e.g., boron hydride molecules with more than 12 boron atoms, are often plagued by complicated synthetic processes, low isolated yields, and/or inconsistent reproducibility.

Although there are several synthetic routes reported in the literature for the preparation of $B_{18}H_{22}$ as a mixture of isomers, they are lengthy, often result in notably low yields, are unreliable and have safety issues associated with the synthesis.

It thus would be desirable to have new methods for preparation of $B_{18}H_{22}$.

SUMMARY

We have now discovered new methods for the preparation of octadecaborane, $B_{18}H_{22}$. The invention is particularly useful for facile synthesis and purification of large quantities of $B_{18}H_{22}$. The present invention also relates to isotopically-enriched $B_{18}H_{22}$. Whereas, by definition, enriched means the modification of the boron isotopes natural abundance. Depending on source natural abundance of the $^{10}B$ isotope ranges from 19.10% to 20.31% and natural abundance of the $^{11}B$ isotope ranges from 80.90% to 79.69%.

A typical $B_{18}H_{22}$ molecular ion beam contains a wide range of ion masses due to a varying number of hydrogen losses from the molecular ion as well as the varying mass due to the two naturally occurring isotopes. As mass selection is possible in an implanter device used in semiconductor manufacture, use of isotopically enriched boron in $B_{18}H_{22}$ can greatly reduce the spread of masses, thereby providing an increased beam current of the desired implantation species. Thus, $^{11}B$ and $^{10}B$ isotopically-enriched $B_{18}H_{22}$ is also of great interest.

In one aspect, the invention provides methods for synthesizing octadecaborane ($B_{18}H_{22}$), which methods suitably comprise: (a) contacting the borane anion $B_{10}H_{10}^{2-}$ with an oxidizing agent to produce $B_{20}H_{18}^{2-}$; and (b) contacting the borane anion $B_{20}H_{18}^{2-}$ with acid to produce $H_2B_{20}H_{18} \cdot xH_2O$.

In a further aspect, the invention provides methods for synthesizing octadecaborane ($B_{18}H_{22}$), which methods suitably comprise (a) contacting the borane anion $B_{10}H_{10}^{2-}$ with an oxidizing agent to produce $B_{20}H_{18}^{2-}$; (b) contacting the borane anion $B_{20}H_{18}^{2-}$ with acid to produce $H_2B_{20}H_{18} \cdot xH_2O$; and (c) separating insoluble byproducts from the reaction mixture.

In certain aspects the invention provides synthesizing $B_8H_{22}$ by methods comprising the steps of:

(a) contacting the borane anion $B_{10}H_{10}^{2-}$ in solvent with an oxidizing cage-coupling agent to produce $B_{20}H_{18}^{2-}$ in situ;

(b) washing of the $B_{20}H_{18}^{2-}$ such as to remove byproducts (c) contacting the borane anion $B_{20}H_{18}^{2-}$ in solvent and water with acid, preferably a molar excess thereof, to produce $H_2B_{20}H_{18}\cdot xH_2O$ in situ;

(d) removing water from the reaction vessel, preferably in the presence of a $B_{18}H_{22}$ solubilizing solvent that remains essentially chemically inert in the system;

(e) separating insoluble byproducts from the reaction mixture through (i) filtration and/or (ii) concentration of reaction solvent, dissolution of $B_{18}H_{22}$ into aliphatic solvent and filtration of byproducts;

(f) isolation of $B_{18}H_{22}$ such as through removal of solvent.

Preferred methods of the invention are suitable to prepare isotopically pure $B_{18}H_{22}$ and mixtures of structural isomers of $B_{18}H_{22}$. That is, the method of the invention, provide $B_{18}H_{22}$ capable of generating a suitable molecular ion beam for ion implantation and high purity $B_{18}H_{22}$ for use in other applications.

In some aspects of the invention, a solution of $B_{10}H_{10}^{2-}$ is reacted in solution with an oxidant in a cage-coupling oxidation to form $B_{20}H_{18}^{2-}$. Preferred oxidants form stable species on reduction that do not significantly react with the $B_{20}H_{18}^{2-}$ produced. Possible oxidizing agents include inorganic metal reagents or organic oxidants with a standard reduction potential of $E°\geq 0$ V. These may include Sn(IV), Fe(III), Cu(II), Mn(VII), Ag(I), Mn(IV), Cr(VI), $Cl_2$, $Br_2$, Hg(I), Hg(II), Au(III), Ce(IV), Pb(IV), Co(III), $F_2$, $I_2$, $O_3$, hydrogen peroxide, organic peroxides, or organometallic compounds. Preferred solvents are mixtures in which the $B_{10}H_{10}^{2-}$ salt is soluble but not destroyed and $B_{20}H_{18}^{2-}$ salt is insoluble but not destroyed. These solvents may include water, alcohols, nitriles, ethers, sulfones, and the like.

The $B_{18}H_{22}$ precursor $H_2B_{20}H_{18}\cdot xH_2O$ is produced in situ by contacting the $B_{20}H_{18}^{2-}$ salt with acid in a chemically inert solvent and water. Preferred acids have a pKa≤2.0 and should not be destructive to any reaction starting materials, intermediates or $B_{18}H_{22}$. These may include mineral acids such as sulfuric acid, nitric acid, phosphoric acid, hydrochloric acid, hydrobromic acid, hydroiodic acid as well as organic acids such as sulfonic acids, halogenated acetic acids, and oxalic acids.

$B_{18}H_{22}$ is formed from $H_2B_{20}H_{18}\cdot xH_2O$ with the simultaneous or subsequent removal of water from the system. Although not wishing to be bound by theory, conditions conducive to removal of water from the hydrated hydronium ion salt, $H_2B_{20}H_{18}\cdot xH_2O$ (where x is a positive real number), are also suitable to induce partial hydronium ion degradation. Typically, preferred degradation conditions include the use of Dean Stark trap, moisture traps, moisture scavengers or contacting the hydrated hydronium salt with one or more drying agents. Drying agents may include, but are not limited to molecular sieves, phosphorus pentoxide, alumina, silica, silicates and the like, or a combination thereof. Reaction solvents should not cause degradation or show significant reactivity to $B_{18}H_{22}$ or any starting materials or intermediates produced during the course of the reaction. These may include, but are not limited to aromatic and arene solvents, alkane solvents, ethers, sulfones, esters, and the like. Reaction temperatures to promote water removal from the system range from 0° C. to about 250° C.

In a preferred aspect, the invention provides for the synthesis of $B_{18}H_{22}$ by methods comprising the steps of:

(a) contacting an ammonium salt of $B_{10}H_{10}^{2-}$ in acidic water (pH≤2.0) with $FeCl_3$ at reflux to produce $B_{20}H_{18}^{2-}$;

(b) washing of the $B_{20}H_{18}^{2-}$ with water such as to remove byproducts;

(c) contacting the borane anion $B_{20}H_{18}^{2-}$ in toluene and water with 5-40 molar equivalents of p-toluenesulfonic acid to produce $H_2B_{20}H_{18}\cdot xH_2O$ in situ;

(d) removing water from the reaction vessel such as in the presence of a hot toluene (90° C. to 120° C.) and through the use of a Dean Stark moisture trap;

(e) separating insoluble byproducts from the reaction mixture through filtration;

(f) removal or concentration of toluene to leave crude $B_{18}H_{22}$ that is contaminated with boric acid and borates;

(g) dissolution of crude $B_{18}H_{22}$ into hexanes and filtration of insolubles;

(h) removal of hexanes to isolate $B_{18}H_{22}$.

In yet another preferred aspect, the invention provides for the synthesis of B18h22 by methods comprising the steps of:

(c) contacting the borane anion $B_{20}H_{18}^{2-}$ in toluene and water with 5-40 molar equivalents of p-toluenesulfonic acid to produce $H_2B_{20}H_{18}\cdot xH_2O$ in situ;

(d) removing water from the reaction vessel such a sin the presence of a hot toluene (90° C. to 120° C.) such as through the use of a Dean Stark moisture trap;

(e) separating insoluble byproducts from the reaction mixture through filtration;

(f) removal or concentration of toluene to leave crude $B_{18}H_{22}$ that is contaminated with boric acid and borates;

(g) dissolution of crude $B_{18}H_{22}$ into hexanes and filtration of insolubles;

(h) removal of hexanes to isolate $B_{18}H_{22}$.

Preferred methods of the invention are suitable to provide $B_{18}H_{22}$ capable of generating a suitable molecular ion beam for ion implantation and high purity $B_{18}H_{22}$ for use in other applications.

The methods of synthesis, which provide $B_{18}H_{22}$ in high isolated yield (>50%) and with few synthetic procedures, are suitable for use in preparing isotopically enriched $B_{18}H_{22}$, e.g., the isotopic concentration of $^{10}B$ or 11B is greater than natural abundance. Preparation of isotopically enriched, $^{10}B$ or $^{11}B$, $B_{18}H_{22}$ is practical using the invention synthesis methods due to the limited number of synthetic steps, mass efficiency, and high overall synthetic yield (>65% from $B_{20}H_{18}^{2-}$).

Other aspects of the invention are disclosed infra.

DETAILED DESCRIPTION

Figure 1:
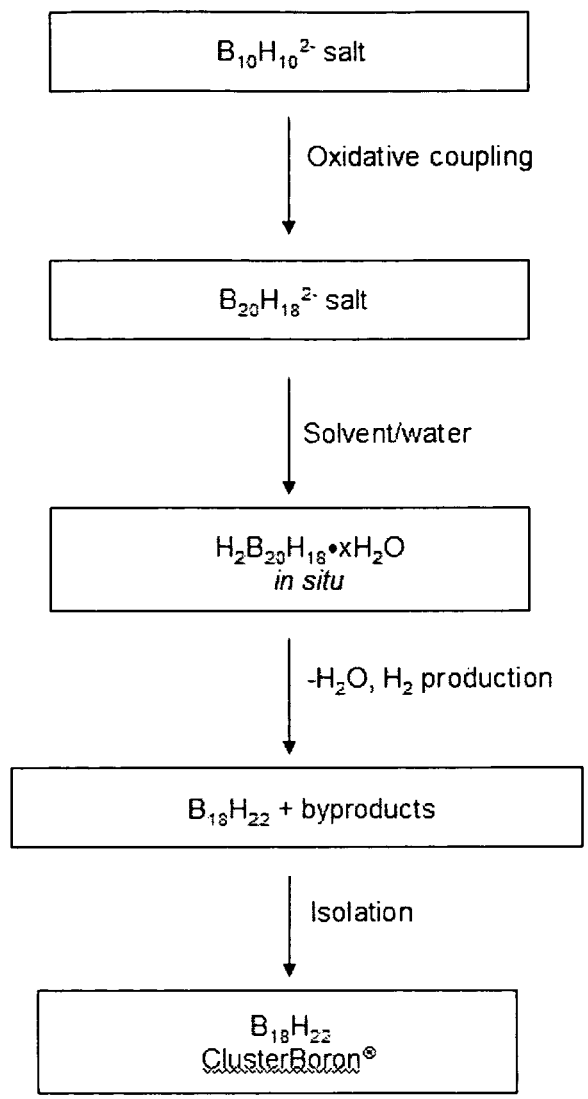
FIG. 1 shows schematically a preferred process of the invention.

In one preferred aspect, the present includes methods of synthesizing octadecaborane ($B_{18}H_{22}$), comprising:

(a) contacting the borane anion $B_{10}H_{10}^{2-}$ preferably in solvent with an oxidizing agent (preferably, an oxidizing cage-coupling agent) to produce $B_{20}H_{18}^{2-}$ preferably in situ;

(b) optionally washing the $B_{20}H_{18}^{2-}$ to remove byproducts;

(c) contacting the borane anion $B_{20}H_{18}^{2-}$ preferably in solvent (e.g. is water, alcohols, nitriles, ethers, sulfones, arenes, aliphatic hydrocarbons, and combinations thereof) and water with acid (preferably a molar excess of acid, with suitable acids including organic and inorganic acids having a pKa of less than about 2 e.g. p-toluene sulfonic acid) to produce $H_2B_{20}H_{18} \cdot xH_2O$ preferably in situ;

(d) optionally removing water from the reaction vessel in the presence of a $B_{18}H_{22}$ solubilizing solvent that remains essentially chemically inert in the system;

(e) separating insoluble byproducts from the reaction mixture preferably through (i) filtration and/or (ii) concentration of reaction solvent, dissolution of $B_{18}H_{22}$ into aliphatic solvent (e.g. alkanes, ethers, or a combination thereof) and filtration of byproducts; and (f) preferably isolation of $B_{18}H_{22}$ such as through solvent removal.

In the above method, the oxidizing agent preferably has a standard reduction potential of $E° \geq 0$ V. More particularly, the oxidizing agent suitably may be an inorganic salt with standard reduction potential of $E° \geq 0$ V. The oxidizing agent also may be an iron(III) salt. The oxidizing agent suitably may be an organometallic compound with a standard reduction potential of $E° \geq 0$ V. The oxidizing agent also suitably may be an organic oxidant with a standard reduction potential of $E° \geq 0$ V. Preferred oxidizing agents include iron(III) salts.

Suitable solvents in step (c) of the above method include wherein the solvent is a mixture of aqueous and non-aqueous solvents, and suitable non-aqueous solvents may be suitably selected from the group consisting of alcohols, nitriles, ethers, arenes, aliphatic hydrocarbons and combinations thereof, more preferably hexanes, toluene, xylenes or a combination thereof, and suitably wherein the non-aqueous solvent comprises between about 1% and about 99% by volume of the total solvent component, suitably with the solvent component comprising between about 1% and 99% water by volume based on total volume of the solvent component.

In another preferred aspect, methods are provided to synthesize octadecaborane ($B_{18}H_{22}$), the methods comprising:

(a) contacting the borane anion $B_{20}H_{18}^{2-}$ preferably in solvent and water with acid (preferably a molar excess, with suitable acids including organic and inorganic acids having a pKa of less than about 2 e.g. p-toluene sulfonic acid) to produce $H_2B_{20}H_{18} \cdot xH_2O$ preferably in situ;

(b) preferably removing water from the reaction vessel in the presence of a $B_{18}H_{22}$ solubilizing solvent that remains essentially chemically inert in the system;

(c) preferably separating insoluble byproducts from the reaction mixture such as through (i) filtration and/or (ii) concentration of reaction solvent, dissolution of $B_{18}H_{22}$ into aliphatic solvent (e.g. alkanes, ethers, or a combination thereof) and filtration of byproducts; and (d) preferably isolating $B_{18}H_{22}$ such as through removal of solvent.

In the above methods, the $B_{10}H_{10}^{2-}$ salt may be suitably an alkyl ammonium salt with a cation formula of $[NR^1R^2R^3R^4]^+$, wherein $R^1$, $R^2$, and $R^3$ are independently selected from the group consisting of hydrogen, $C_{1-20}$alkyl, $C_{6-10}$aryl, $C_{7-10}$aralkyl, or any two of $R^1$, $R^2$, or $R^3$ taken in combination form a heterocyclic ring; and $R^4$ is selected from hydrogen, $C_{1-20}$alkyl, or $C_{6-10}$aryl;

In the above methods, the $B_{20}H_{18}^{2-}$ salt may be suitably an alkyl ammonium salt with a cation formula of $[NR^1R^2R^3R^4]^+$, wherein $R^1$, $R^2$, and $R^3$ are independently selected from the group consisting of hydrogen, $C_{1-20}$alkyl, $C_{6-10}$aryl, $C_{7-10}$aralkyl, or any two of $R^1$, $R^2$, or $R^3$ taken in combination form a heterocyclic ring; and $R^4$ is selected from hydrogen, $C_{1-20}$alkyl, or $C_{6-10}$aryl;

In the above methods, the $B_{20}H_{18}^{2-}$ salt may be suitably an inorganic salt.

Suitable solvents in step (a) of the above method include wherein the solvent is a mixture of aqueous and non-aqueous solvents, and suitable non-aqueous solvents may be suitably selected from the group consisting of alcohols, nitriles, ethers, arenes, aliphatic hydrocarbons and combinations thereof, more preferably hexanes, toluene, xylenes or a combination thereof, and suitably wherein the non-aqueous solvent comprises between about 1% and about 99% by volume of the total solvent component, suitably with the solvent component comprising between about 1% and 99% water by volume based on total volume of the solvent component.

Figure 2:
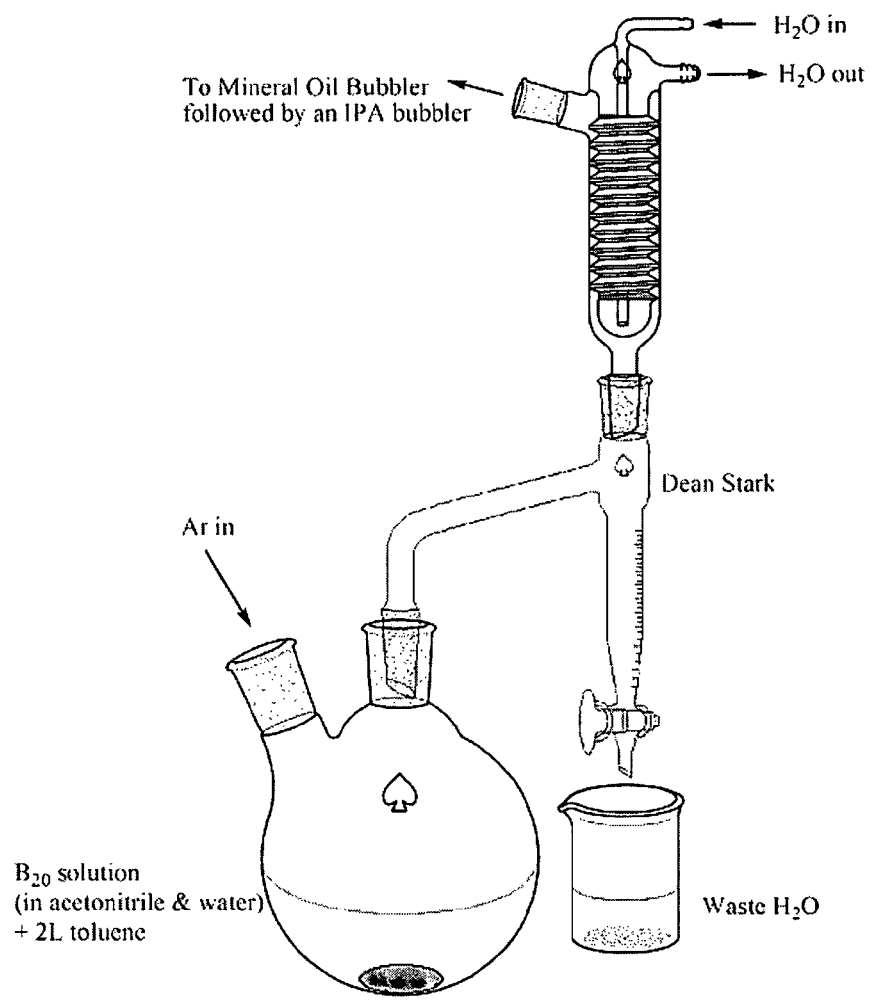
FIG. 2 shows use of a reaction set-up according to a preferred process of the invention.

In the above methods, water may be removed from the reaction mixture by a variety of methods including e.g. through the use of moisture traps, moisture scavengers, or more drying agents such as molecular sieves, phosphorus pentoxide, alumina, silica, silicates and the like, or a combination thereof. A Dean-Stark trap can be preferred such as illustrated in FIG. 2.

In another aspect, a method of synthesizing octadecaborane ($B_{18}H_{22}$) is provided, the method comprising:

(a) contacting an ammonium salt of $B_{10}H_{10}^{2-}$ in acidic water (pH≤2.0) with $FeCl_3$ at reflux to produce $B_{20}H_{18}^{2-}$;

(b) washing of the $B_{20}H_{18}^{2-}$ with water to remove byproducts;

(c) contacting the borane anion $B_{20}H_{18}^{2-}$ in toluene and water with 5-40 molar equivalents of p-toluenesulfonic acid to produce $H_2B_{20}H_{18} \cdot xH_2O$ in situ;

(d) removing water from the reaction vessel in the presence of a hot toluene (90° C. to 120° C.) through the use of a Dean Stark moisture trap (see FIG. 3);

(e) separating insoluble byproducts from the reaction mixture through filtration;

(f) removal or concentration of toluene to leave crude $B_{18}H_{22}$ that is contaminated with boric acid and borates;

(g) dissolution of crude $B_{18}H_{22}$ into hexanes and filtration of insolubles;

(h) removal of hexanes to isolate $B_{18}H_{22}$

In a further aspect, a method of synthesizing octadecaborane ($B_{18}H_{22}$) is provided, the method comprising:

(a) contacting the borane anion $B_{20}H_{18}^{2-}$ in toluene and water with 5-40 molar equivalents of p-toluenesulfonic acid to produce $H_2B_{20}H_{18} \cdot xH_2O$ in situ;

(b) removing water from the reaction vessel in the presence of a hot toluene (90° C. to 120° C.) through the use of a Dean Stark moisture trap (see FIG. 3);

(c) separating insoluble byproducts from the reaction mixture through filtration;

(d) removal or concentration of toluene to leave crude $B_{18}H_{22}$ that is contaminated with boric acid and borates;

(e) dissolution of crude $B_{18}H_{22}$ into hexanes and filtration of insolubles;

(f) removal of hexanes to isolate $B_{18}H_{22}$

In methods of the invention wherein the isotopic concentration of $^{10}B$ atoms suitably may be greater than the natural abundance, e.g. wherein at least about 50% of the boron atoms present in the product $B_{18}H_{22}$ are $^{10}B$, or wherein at least about 80% of the boron atoms present in the product $B_{18}H_{22}$ are $^{10}B$, or wherein at least about 90% of the boron atoms present in the product $B_{18}H_{22}$ are $^{10}B$, or wherein at least about 95% of the boron atoms present in the product $B_{18}H_{22}$ are $^{10}B$, or wherein at least about 99% of the boron atoms present in the product $B_{18}H_{22}$ are $^{10}B$.

In the methods of the invention, the isotopic concentration of $^{11}B$ atoms suitably may be greater than the natural abundance, e.g. wherein at least about 90% of the boron atoms present in the product $B_{18}H_{22}$ are $^{11}B$, or wherein at least about 95% of the boron atoms present in the product $B_{18}H_{22}$ are $^{11}$B, or wherein at least about 99% of the boron atoms present in the product $B_{18}H_{22}$ are $^{11}$B.

FIG. 1 of the drawings also depicts a specifically preferred method of the invention.

The invention now being generally described, it will be more readily understood by reference to the following examples, which are included merely for purposes of illustration of certain aspects and embodiments of the present invention, and are not intended to limit the invention.

Example 1

Re-crystallized but not dried $(HNEt_3)_2B_{20}H_{18}\cdot xH_2O$ prepared from $(HNEt_3)_2B_{10}H_{10}$ (100.0 g, 0.31 mol) and p-$C_7H_4SO_3H\cdot H_2O$ (265.4 g, 1.40 mol) are weighed into a 1 L two-necked round bottomed flask. Toluene (1 L) and water (113 mL) are added to the flask the Dean Stark apparatus is assembled as in FIG. 3 and the trap filled with toluene. After purging with argon for 45 minutes, the solution is brought to reflux with rapid stirring. Following the removal of most of the water from the reaction, hydrogen evolution significantly increases and precipitate begins to form. When hydrogen evolution ceases, the reaction is cooled and insolubles filtered away. The toluene layer is separated from any oils present, washed with water (3×200 mL), dried over $MgSO_4$ and concentrated to dryness to give a light yellow powder. The powder is extracted with 1 L of hexanes and any insolubles are removed by filtration. The hexane solution is removed to leave white to off-white $B_{18}H_{22}$ (16.8 g, 50.6%).

Example 2

Re-crystallized but not dried $(HNEt_3)_2{}^{11}B_{20}H_{18}\cdot xH_2O$ prepared from $(HNEt_3)_2{}^{11}B_{10}H_{10}$ (5.00 g, 15.4 mmol) and p-$C_7H_4SO_3H\cdot H_2O$ (14.32 g, 75.3 mmol) are weighed into a 1 L two-necked round bottomed flask. Toluene (150 L) and water (30 mL) are added to the flask the Dean Stark apparatus is assembled as in FIG. 3 and the trap filled with toluene. After purging with argon for 45 minutes, the solution is brought to reflux with rapid stirring. Following the removal of most of the water from the reaction, hydrogen evolution significantly increases and precipitate begins to form. When hydrogen evolution ceases, the reaction is cooled and insolubles filtered away. The toluene layer is separated from any oils present, washed with water (3×100 mL), dried over $MgSO_4$ and concentrated to dryness to give a light yellow powder. The powder is extracted with 250 mL of hexanes and any insolubles are removed by filtration. The hexane solution is removed to leave white to off-white $^{11}B_{18}H_{22}$ (0.85 g, 50.1%). $^{11}$B enrichment was determined to be that of the starting material (>98.6% $^{11}$B isotopic enrichment).

The invention has been described in detail with reference to preferred embodiments thereof. However, it will be appreciated that those skilled in the art, upon consideration of the disclosure, may make modifications and improvements within the spirit and scope of the invention.

REFERENCES

1. Jemmis, E. D.; Balakrishnarajan, M. M.; Pancharatna, P. D., Electronic Requirements for Macropolyhedral Boranes. *Chem. Rev.* 2002, 102, 93-144.
2. Jemmis, E. D.; Balakrishnarajan, M. M.; Pancharatna, P. D., A unifying Electron-Counting Rule for Macropolyhedral Boranes, metallaboranes, and Metallocenes. *J. Amer. Chem. Soc.* 2001, 123, 4313-4323.
3. Pitochelli, A. R.; Hawthorne, M. F., The Preparation of a New Boron Hydride $B_{18}H_{22}$. *J. Amer. Chem. Soc.* 1962, 84, 3218.
4. Hawthorne, M. F.; Pilling, R. L.; Stokely, P. F., The preparation and rearrangement of the three isomeric $B_{20}H_{18}{}^{4-}$ ions. *J. Am. Chem. Soc.* 1965, 87, 1893-1899.
5. Olsen, F. P.; Vasavada, R. C.; Hawthorne, M. F., The chemistry of n-$B_{18}H_{22}$ and i-$B_{18}H_{22}$. *J. Am. Chem. Soc.* 1968, 90, (15), 3946-3951.
6. Chamberland, E. L.; Muetterties, E. L., Chemistry of Boranes. XVIII. Oxidation of $B_{10}H_{10}{}^{-2}$ and its derivatives. *Inorg. Chem.* 1964, 3, 1450-1456.

All of the patents and publications cited herein are hereby incorporated by reference in their entirety.

Those skilled in the art will recognize, or be able to ascertain using no more than routine experimentation, many equivalents to the specific embodiments of the invention described herein. Such equivalents are intended to be encompassed by the following claims.

What is claimed is:

1. A method of synthesizing octadecaborane ($B_{18}H_{22}$), the method comprising:
    (a) contacting the borane anion $B_{10}H_{10}{}^{2-}$ with an oxidizing agent to produce $B_{20}H_{18}{}^{2-}$ in situ; and
    (b) contacting the borane anion $B_{20}H_{18}{}^{2-}$ with acid to produce $H_2B_{20}H_{18}\cdot xH_2O$ insitu,
        wherein the $B_{18}H_{22}$ is isotopically enriched and contains boron atoms of $^{10}$B and/or $^{11}$B, wherein said $^{10}$B and/or $^{11}$B atoms are present at a concentration greater than their natural abundance.

2. The method of claim 1 wherein the oxidizing agent is a oxidizing cage-coupling agent.

3. The method of claim 1 further comprising after step (b) removing water from the reaction vessel in the presence of a $B_{18}H_{22}$ solubilizing solvent that remains essentially chemically inert in the system.

4. The method of claim 1 wherein in step (c) byproducts can be separated through (i) filtration and/or (ii) concentration of reaction solvent, dissolution of $B_{18}H_{22}$ into aliphatic solvent and filtration of byproducts.

5. The method of claim 1 wherein after step (c) $B_{18}H_{22}$ is isolated.

6. The method of claim 1 wherein the borane anion $B_{10}H_{10}{}^{2-}$ is an alkyl ammonium salt with a cation formula of $[NR^1R^2R^3R^4]^+$, wherein
    $R^1$, $R^2$, and $R^3$ are independently selected from the group consisting of hydrogen, $C_{1-20}$alkyl, $C_{6-10}$aryl, $C_{7-10}$aralkyl, and any two of $R^1$, $R^2$, or $R^3$ which taken in combination form a heterocyclic ring; and
    $R^4$ is selected from hydrogen, $C_{1-20}$alkyl, or $C_{6-10}$aryl.

7. The method of claim 1 wherein the borane anion $B_{20}H_{18}{}^{2-}$ is an alkyl ammonium salt with a cation formula of $[NR^1R^2R^3R^4]^+$, wherein
    $R^1$, $R^2$, and $R^3$ are independently selected from the group consisting of hydrogen, $C_{1-20}$alkyl, $C_{6-10}$aryl, $C_{7-10}$aralkyl, and any two of $R^1$, $R^2$, or $R^3$ which taken in combination form a heterocyclic ring; and
    $R^4$ is selected from hydrogen, $C_{1-20}$alkyl, or $C_{6-10}$aryl.

8. The method of claim 1 wherein the borane anion $B_{20}H_{18}{}^{2-}$ salt is an inorganic salt.

9. The method of claim 1 wherein the oxidizing agent has a standard reduction potential of $E°\geq 0$ V.

10. The method of claim 1 wherein the oxidizing agent is an iron(III) salt.

11. The method of claim 3 wherein the solvent comprise a mixture of one or more aqueous solvents and one or more non-aqueous solvents.

12. The method of claim 1 wherein the dissolution solvent is selected from the group consisting of alkanes, ethers, and a combination thereof.

13. The method of claim 12 wherein the dissolution solvent is hexanes.

14. The method of claim 1 wherein at least about 50% of the boron atoms present in the product $B_{18}H_{22}$ are $^{10}B$.

15. The method of claim 1 wherein at least about 80% of the boron atoms present in the product $B_{18}H_{22}$ are $^{10}B$.

16. The method of claim 1, wherein at least about 90% of the boron atoms present in the product $B_{18}H_{22}$ are $^{10}B$.

17. The method of claim 1, wherein at least about 90% of the boron atoms present in the product $B_{18}H_{22}$ are $^{11}B$.

18. A method of synthesizing octadecaborane ($B_{18}H_{22}$), the method comprising:
   (a) contacting the borane anion $B_{10}H_{10}^{2-}$ with an oxidizing agent to produce $B_{20}H_{18}^{2-}$ in situ;
   (b) contacting the borane anion $B_{20}H_{18}^{2-}$ with acid to produce $H_2B_{20}H_{18} \cdot xH_2O$ in situ; and
   (c) separating insoluble byproducts from the reaction mixture,
      wherein the $B_{18}H_{22}$ is isotopically enriched and contains born atoms of $^{10}B$ and/or $^{11}B$, wherein said $^{10}B$ and/or $^{11}B$ atoms are present at a concentration greater than their natural abundance.

19. A method of synthesizing octadecaborane ($B_{18}H_{22}$), the method comprising:
   (a) contacting a borane anion $B_{20}H_{18}^{2-}$ with acid to produce $H_2B_{20}H_{18} \cdot xH_2O$ in situ;
   (b) removing water from the reaction vessel in the presence of a $B_{18}H_{22}$ solubilizing solvent that remains essentially chemically inert in the system; and
   (c) separating insoluble byproducts from the reaction mixture through (i) filtration and/or (ii) concentration of reaction solvent, dissolution of $B_{18}H_{22}$ into aliphatic solvent and filtration of byproducts;
      wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

20. A method of synthesizing octadecaborane ($B_{18}H_{22}$), the method comprising:
   (a) contacting an ammonium salt of $B_{10}H_{10}^{2-}$ in acidic water (pH≤2.0) with $FeCl_3$ to produce $B_{20}H_{18}^{2-}$;
   (c) contacting the borane anion $B_{20}H_{18}^{2-}$ with acid to produce $H_2B_{20}H_{18} \cdot xH_2O$ in situ;
   (d) removing water from the reaction vessel;
   (e) separating insoluble byproducts from the reaction mixture;
   (f) optional solvent removal to provide crude $B_{18}H_{22}$ that is contaminated with boric acid and borates;
   (g) dissolution of crude $B_{18}H_{22}$ into hexanes and filtration of insolubles;
      wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

21. The method of claim 20 comprising removal of solvent to isolate $B_{18}H_{22}$.

22. A method of synthesizing octadecaborane ($B_{18}H_{22}$), the method comprising:
   (a) contacting the borane anion $B_{20}H_{18}^{2-}$ in toluene and water with 5-40 molar equivalents of p-toluenesulfonic acid to produce $H_2B_{20}H_{18} \cdot xH_2O$ in situ;
   (b) removing water from the reaction vessel in the presence of a hot toluene (90° C. to 120° C.) through the use of a Dean Stark moisture trap;
   (c) separating insoluble byproducts from the reaction mixture through filtration;
   (d) removal or concentration of toluene to leave crude $B_{18}H_{22}$ that is contaminated with boric acid and borates;
   (e) dissolution of crude $B_{18}H_{22}$ into hexanes and filtration of insolubles;
   (f) removal of hexanes to isolate $B_{18}H_{22}$;
      wherein the $B_{18}H_{22}$ is isotopically enriched and contains boron atoms of $^{10}B$ and/or $^{11}B$, wherein said $^{10}B$ and/or $^{11}B$ atoms are present at a concentration greater than their natural abundance.

* * * * *